No. 621,606. Patented Mar. 21, 1899.
P. B. HARRISON.
BRAKE BEAM.
(Application filed Dec. 30, 1897.)
(No Model.)
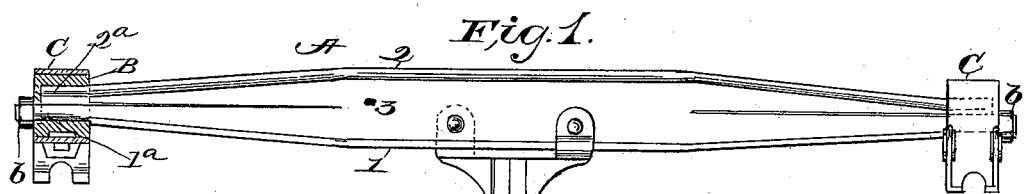
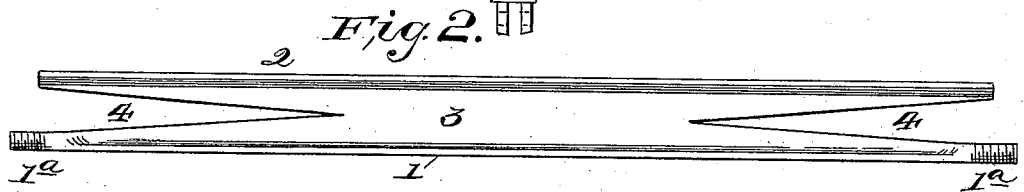
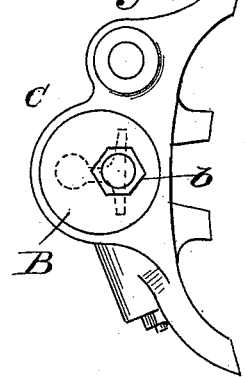
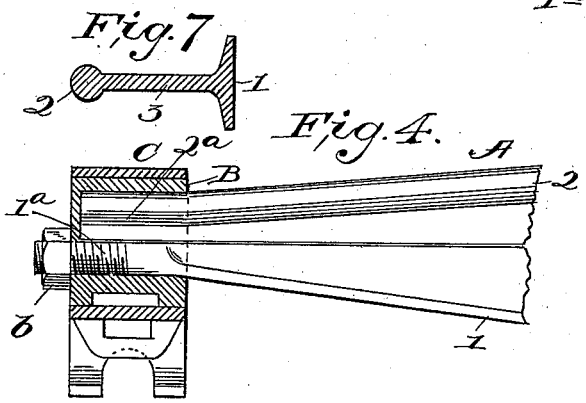
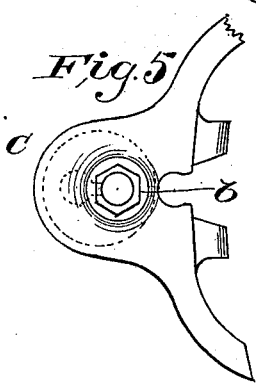
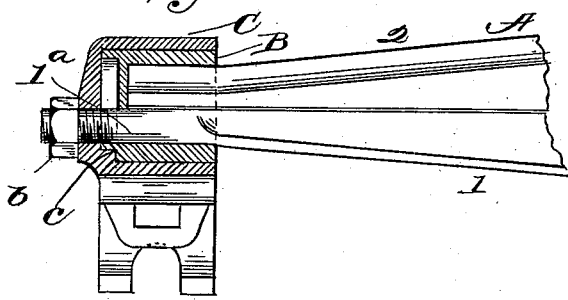
Witnesses
Inventor
Philip B Harrison
By his Attorney

UNITED STATES PATENT OFFICE.

PHILIP B. HARRISON, OF CHICAGO, ILLINOIS, ASSIGNOR TO THE CHICAGO RAILWAY EQUIPMENT COMPANY, OF SAME PLACE.

BRAKE-BEAM.

SPECIFICATION forming part of Letters Patent No. 621,606, dated March 21, 1899.

Application filed December 30, 1897. Serial No. 664,575. (No model.)

*To all whom it may concern:*

Be it known that I, PHILIP B. HARRISON, a citizen of the United States, residing at Chicago, in the county of Cook, State of Illinois, have invented certain new and useful Improvements in Brake-Beams; and I hereby declare the following to be a full, clear, and exact description of the same, reference being had to the accompanying drawings, in which—

Figure 1 is a plan view of a brake-beam embodying my invention, the left-hand brake-head and end bearing or sleeve being in section to show the construction of the end of the beam proper. Fig. 2 is a plan view of the beam proper, the end bearings or sleeves and brake-heads being removed. Fig. 3 is an enlarged end view of the brake-beam and its adjuncts. Fig. 4 is an enlarged view of the end of the brake-beam shown in Fig. 1, the end bearing or sleeve and brake-head being shown in section. Fig. 5 is an end view of a brake-beam embodying my invention, showing the use therewith of a fixed brake-head. Fig. 6 is a plan view of the end of the brake-beam and a sectional view of the end bearing or sleeve and fixed brake-head shown in Fig. 5. Fig. 7 is an enlarged transverse section of an I or T beam such as is used in the construction of a brake-beam embodying my invention.

Like symbols refer to like parts wherever they occur.

My invention relates to the construction of that class of metallic brake-beams in which the beam proper has the general cross-section of an I or T beam—that is to say, a plurality of ribs or flanges united by a web—and has for its object to both lighten and stiffen the structure. To accomplish these results, I so shape the beam or main member and combine therewith end bearings or end caps and tension devices that when set up one edge or rib of the beam or main member shall be normally held under compression and the other normally held under tension, the beam as a whole approximating a trussed structure, and such a construction embodies the main feature of my invention.

In carrying out my invention I remove a gore or V shaped section from the web at each end of the beam or main member, reducing the length of that edge or rib which is to constitute the back or rear edge of the beam and combine therewith end bearings for the short side or rib of the beam and a tension device for the front side or rib of the beam, and such a combination or its equivalent embodies a second feature of my invention.

Preferably the end bearings, which are combined with the beam having the gore or V shaped slots, are in the form of cups or sleeves having sockets for the reception of the short ribs and slots for the passage of the long ribs, which latter are threaded and provided with tension-nuts, and such a combination embodies a further feature of my invention.

I will now proceed to describe my invention more fully, so that others skilled in the art to which it appertains may apply the same.

In the drawings, A indicates the main member or beam proper; B, the end bearings, cups, or sleeves; C, the brake-heads; $b$, the tension devices, and D the lever or fulcrum post.

The main member or beam proper is preferably either what is generally termed an "I-beam" or a "T-beam"—that is to say, one having the marginal ribs or flanges 1 and 2 united by the web 3, and from said web at each end I remove gore-shaped sections, so as to leave V-shaped slots 4 with their apices toward the center of the beam.

That rib or edge 1 of the beam which is to constitute the front of the beam or tension section when the beam is completed is drawn rounded and threaded at each end, as at $1^a$, to receive the tension-nuts $b\ b$, and the ends of said rib 1 project beyond the ends of the rear rib 2, which is to constitute the compression-section in the completed beam.

B B indicate the end bearings, which are each provided with a cup or socket $2^a$ for the reception of the end of the rib 2 and with a hole for the passage of the threaded end of rib 1, which receives the tension-nut $b$. The interior shape of said bearings or cups will preferably conform to the cross-section of the ends of the beam when the edges of the V-shaped slots have been brought in apposition, as indicated in dotted lines, Figs. 3 and 5 of the drawings.

In Figs. 1, 3, and 4 of the drawings the end bearing or cup has been shown as forming a journal for an automatically-adjustable spring-head. (See Robischung patent, No. 485,823, dated November 8, 1892.) Consequently the seat of the tension device $b$ is formed directly on the end bearing, so as to permit rotation of the brake-head C, while in Figs. 5 and 6 of the drawings, which is what is termed a "fixed" head, (see Hien patent, No. 480,194, dated August 2, 1892,) the end of the sleeve or cup is notched to receive a lug $c$ on the interior of the brake-head C, (see Fig. 6,) and consequently the seat of the nut $b$ or tension device is transferred to the brake-head or to a cap-plate, which may be used to close the brake-head. As the latter features can be found fully described in the Hien patent, No. 480,194, and the Robischung patent, No. 485,823, and form no part of the present invention, they need not here be further described.

The construction of the main member A of the beam and the end bearings or cups B B being of the general character hereinbefore pointed out, the brake-beam is set up as follows:

The fulcrum or lever post D having been applied and riveted or bolted to the beam, the ribs 1 and 2 are forced together at the ends of the beam until the edges of the V-shaped slots 4 are in or substantially in apposition, after which the end bearings or cups B B are slipped on the ends of the beam, the ends of the rib 2 resting in the sockets $2^a$ and the threaded ends of the rib 1 projecting through the slots or perforations in the end cups, after which the tension-nuts $b$ $b$ are applied to the threaded rib and screwed home until the rib 2 is under the desired compression and the rib 1 under the desired tension.

In case fixed brake-heads are employed, Figs. 5 and 6, the heads will be applied over the end cups or bearings before the tension-nuts are applied; but in case spring-heads, Figs. 3 and 4, are used the brake-heads may be applied after the beam has been set up and the parts put in compression and tension, as above noted.

While neither the notched beam and lug on the interior of the head constituting the fixed head, as shown in Fig. 6, nor the spring-head, as indicated in Fig. 3, forms any part of the present invention, yet I prefer to use one or other with my beam to obtain the "throw" required for "underhung" beams and as a ready means of adapting the throw of the head to different heights of hanging. Otherwise a different end cup B would be required for each throw of the brake-head, which would add materially to the cost of manufacture.

Having thus described my invention, what I claim, and desire to secure by Letters Patent, is—

1. In a brake-beam the combination with a member having ribs or flanges connected by a web said web having gore or V shaped slots at its ends, of means for normally holding one of said ribs under tension and the other under compression, substantially as and for the purposes specified.

2. In a brake-beam, the combination with a member having longitudinal ribs connected by a web having a gore-shaped slot at each end, of end cups each having a socket to receive one rib and a slot to permit the passage of the other rib of said member, and means for applying tension to one and compression to the other rib of said member, substantially as and for the purposes specified.

3. In a brake-beam, the combination with an I-beam having a V-shaped slot in the web at each end and one of its ribs or flanges threaded at its ends, of end cups having sockets for the reception of the plain rib and slots for the passage of the ends of the threaded ribs, and tension-nuts on the ends of the threaded rib said tension-nuts having seats on the end cups, substantially as and for the purposes specified.

In testimony whereof I affix my signature, in presence of two witnesses, this 28th day of December, 1897.

PHILIP B. HARRISON.

Witnesses:
    E. T. WALKER,
    P. J. CUNNEEN.